Figure 2:
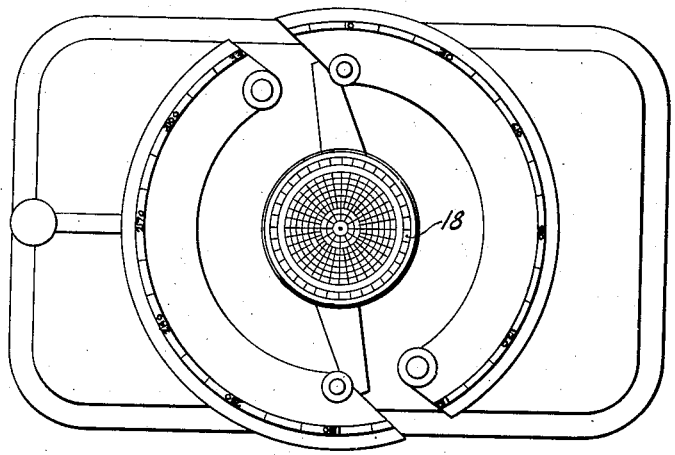

Oct. 14, 1947.   D. E. SHEAHAN   2,429,032
METHOD FOR BALANCING PNEUMATIC TIRES
Filed Nov. 24, 1942   2 Sheets-Sheet 1

Inventor
Daniel E. Sheahan
By
Attorney

Oct. 14, 1947.    D. E. SHEAHAN    2,429,032
METHOD FOR BALANCING PNEUMATIC TIRES
Filed Nov. 24, 1942    2 Sheets-Sheet 2

Inventor
Daniel E. Sheahan

By

Attorney

Patented Oct. 14, 1947

2,429,032

UNITED STATES PATENT OFFICE 2,429,032

METHOD FOR BALANCING PNEUMATIC TIRES

Daniel E. Sheahan, Akron, Ohio, assignor to Wingfoot Corporation, Akron, Ohio, a corporation of Delaware Application November 24, 1942, Serial No. 466,735

5 Claims. (Cl. 154—14)

This invention relates to methods and apparatus for balancing circular objects, and, more particularly, is concerned with improved means and methods for balancing pneumatic tires.

Heretofore, it has been the usual procedure to improve the balance and operation of a pneumatic tire on a vehicle by one or more of several known ways. For example, the complete tire, tube and wheel assembly has been measured for out of balance, and little weights have been attached to the wheel or rim to compensate for any out of balance which exists. Again, it has been proposed and practiced to balance the vulcanized tire after the vulcanization by the application of weights usually in the form of self-vulcanizing rubber patches applied to the inner periphery of the tread portion of the tire. Also, the inner tube valve stem has been placed opposite to the heavy side of a tire. In any event, these and other known methods of balancing tire and wheel assemblies are open to the objection that the weights applied to the wheel or rim may come loose or their circumferential relation to the tire may be altered during a tire change, or the rubber patch material applied to the tire itself provides a lump which is objectionable in appearance and which sometimes balls up or becomes detached in the continued use of the tire, or the tube valve stem in a tire change may not be placed opposite the heavy side of the tire.

It is the general object of the invention to avoid and overcome the foregoing and other difficulties of and objections to known balancing procedures by the provision of improved methods and apparatus for facilitating the balancing of the pneumatic tire itself, and with the methods and apparatus resulting in a balanced tire which has an appearance undistinguishable from an unbalanced tire and with the balancing material being so intimately incorporated therein that it will not dislodge nor ball up in use.

Another object of the invention is to provide an improved method for speeding up, reducing the cost of, and improving the quality of the balancing of a pneumatic tire.

Another object of the invention is the provision of a simple, practical method for balancing the unvulcanized tire in its built form.

Another object of the invention is to provide improved apparatus of relatively inexpensive, easily-operated character for balancing a pneumatic tire in its unvulcanized built form and while fully supporting the entire inner periphery of the tire carcass.

The foregoing and other objects of the invention are achieved by the method of manufacturing a pneumatic tire which includes the steps of building a complete tire carcass in substantially flat band unvulcanized form, supporting the carcass over substantially its entire inner periphery in axially aligned relation, measuring the amount of out of balance of the tire carcass while so supported, attaching a body of unvulcanized rubber of proper size to the tire carcass to bring the carcass back in balance after it is shaped, shaping the carcass from its built shape to toroidal form, and vulcanizing the carcass in its toroidal form by the application of heat and pressure thereto, and concurrently curing the body of balancing rubber to the carcass.

The apparatus of the invention includes a vertical balancing spindle mounted for tilting movement about a pivot point, means for releasably locking the spindle, a shell having an external contour adapted to engage with and support the tire carcass over substantially its entire inner periphery, means for collapsing and expanding the shell and for supporting it axially of the spindle, and gauge means on the spindle for indicating the amount of out of balance of the tire.

Figure 3:
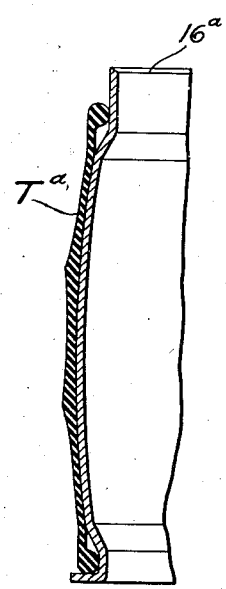
Figure 1:
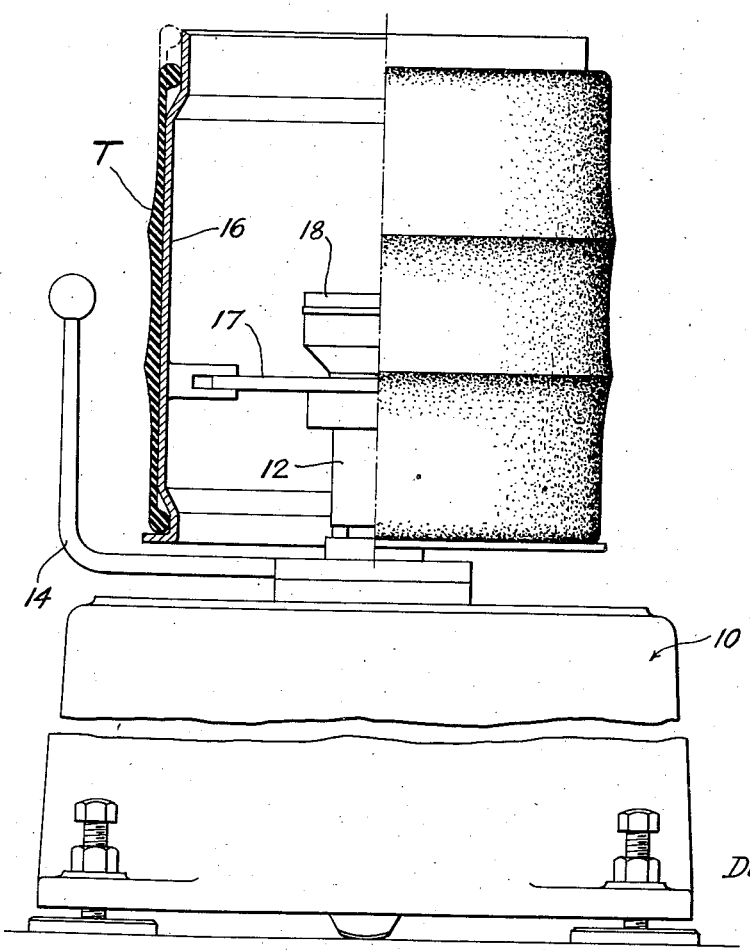
Figure 4:
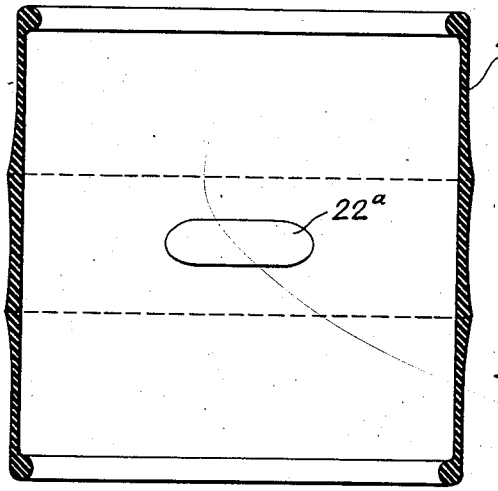
Figure 7:
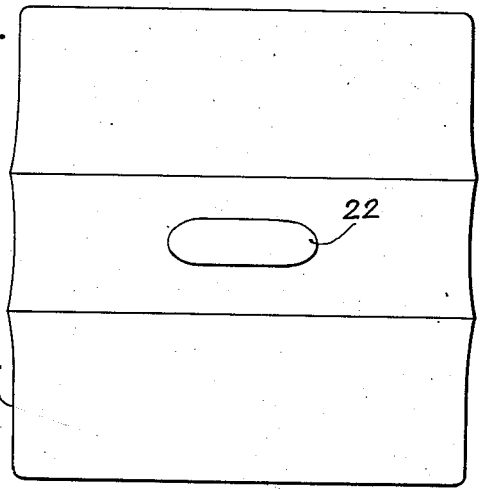
Figure 5:
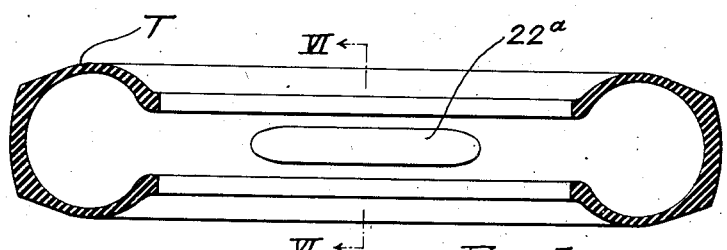
Figure 6:
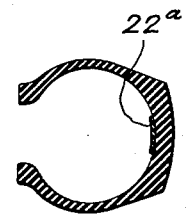
Figure 8:
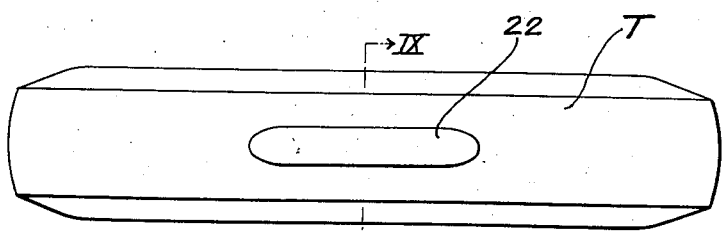
Figure 9:
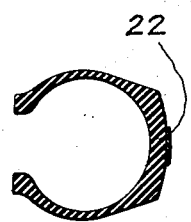

For a better understanding of the invention, reference should be had to the accompanying drawings, wherein Fig. 1 is a side elevation, partly in section, of a typical apparatus constructed in accordance with the principles of the invention; Fig. 2 is a plan view of the apparatus shown in Fig. 1; Fig. 3 is a fragmentary cross sectional view similar to the portion of the apparatus shown in section in Fig. 1, but illustrating a modification of the supporting shell; Fig. 4 is a cross sectional view of a tire carcass in its built form, and with a balancing patch secured to the inner periphery thereof; Fig. 5 is a view similar to Fig. 4, but illustrating the tire carcass after it has been shaped to toroidal form; Fig. 6 is a cross sectional view taken on line VI—VI of Fig. 5; Fig. 7 is a side elevation of a tire carcass in its built form, and illustrates the application of a balancing patch to the outer surface thereof; Fig. 8 is a view similar to Fig. 7, but showing the tire carcass shaped to toroidal form; and Fig. 9 is a cross sectional view taken on line IX—IX of Fig. 8.

Referring to the drawings, the numeral 10 indicates generally a balancing apparatus of the type having a vertical spindle 12 mounted for tilting movement about a pivot point, and with the spindle being adapted to be locked in vertical position by quickly releasable means controlled through lever 14. The spindle 12 supports a shell 16, and the shell 16 is constructed so that it may be expanded or collapsed by mechanism 17. The shell 16 has an outer contour adapted to closely engage and support substantially the entire inner periphery of a pneumatic tire carcass T in the flat band form in which it is built. Every portion of the shell 16 and of the tire carcass T is supported in true axial alignment with the spindle 12 so that a proper out of balance determination of the tire carcass T can be made. Gauge means 18, mounted on the top of the spindle 12, are provided to measure the amount of out of balance of the tire carcass T.

In Fig. 3 there has been illustrated a modified form of shell 16a which is adapted to support a tire carcass Ta. The tire carcass Ta is built upon a building drum having a greater crown than the building drum upon which the tire carcass T is constructed. Thus, the shell 16a is built with a surface contour substantially identical with the surface contour of the drum upon which the tire Ta is built so that, during the measuring operation, every portion of the tire carcass Ta is adequately and accurately supported in alignment with the spindle 12.

In the use of the apparatus illustrated in Figs. 1 to 3 of the drawings, a tire carcass T in the built form, and while still unvulcanized, is slipped over the top of the collapsed shell 16. During the time the carcass T is slipped over the shell 16, the lever 14 may be thrown so that the spindle 12 is locked in a vertical position. Once the carcass T is positioned over the shell 16 and down against the outwardly turned flange at the bottom thereof, the shell 16 is expanded to closely support the carcass in proper axial alignment with the spindle 12. Now, the lever 14 is thrown to release the lock on the spindle 12, and the spindle is free to tilt in response to the amount of out of balance of the carcass T. The amount of out of balance is indicated by the gauge means 18 which is calibrated in concentric circles, each one showing a greater amount of out of balance in combination with a curved, gauged glass and an air bubble beneath the glass. The spindle mounting is such that greater degrees of tilting require greater amounts of out of balance. Inasmuch as this gauging means and the spindle mounting form no part of the present invention, they have not been illustrated nor will they be described in greater detail.

In any event, once the amount of out of balance of the carcass T is determined, and the point of out of balance is determined, the lever 14 may be thrown to again lock the shell 16, whereupon an operator will buff or clean a suitable spot on the outer periphery of the carcass T adjacent the center thereof and will then apply a body of rubber of sufficient weight so that, when the tire carcass is expanded to toroidal form, the carcass will be in balance. In Figs. 7, 8 and 9 of the drawings, the body of rubber applied to the outer portion of the carcass T has been indicated by the numeral 22, and Fig. 7 shows the position and character of the body of rubber 22 as applied to the tire carcass while it is still in its built form. The body of rubber 22 is usually in the form of unvulcanized rubber strip which may be part of a long roll of rubber strip suitably printed or marked so that by correlating the markings on the rubber strip with the divisions on the gauge, 18, it is a simple matter to cut off the necessary length of strip to provide a rubber body 22 which will achieve the proper balancing of the tire carcass.

When the rubber body 22 is secured to the outer periphery of the tire carcass, it is made of the same type of stock as the tread portion of the tire carcass, and is stuck on to the outside of the tire with or without the aid of cement. Preferably, the rubber body 22, which is kept clean on one side by being normally supported on linen or a liner, is removed therefrom and is directly applied to a cleaned spot on the outer periphery of the tire T. After the rubber body 22 is applied to the tire carcass T in the manner shown in Fig. 7, and with the tire carcass and the body 22 being unvulcanized, the tire carcass is then shaped to toroidal form, as seen in Fig. 8, and the rubber body 22 stretches circumferentially to the position shown in Figs. 8 and 9. Thereafter, the tire carcass and associated patch or rubber body 22 are concurrently vulcanized by the application of steam and pressure, usually in molding means of known character. This vulcanizing operation not only vulcanizes the tire carcass but vulcanizes the rubber body 22 intimately to the tire carcass so that it is very difficult, if not impossible, to see or discover the rubber body 22 in the tread of the vulcanized tire.

In Figs. 4, 5 and 6, there has been illustrated the application of a rubber body 22a to the inner periphery of the tire carcass T, and this comprises another embodiment of the invention. The advantage of applying the rubber body 22 to the outer periphery of the tire carcass T is that the tire carcass is supported to facilitate the application of the rubber body. In other words, the shell 16 fully supports the tire carcass T so that the rubber body 22 can be applied to the outside of the supported carcass and the carcass can even be readily checked for balance after the rubber body has been applied thereto, the checking being achieved merely by throwing the operating handle 14 to the released position.

On the other hand, when the rubber body 22a is applied to the inner periphery of the unshaped tire carcass T, it is necessary to collapse the shell 16 after marking the tire carcass T, and then apply the rubber body 22a to the inner periphery of the tire carcass. When the rubber body 22a is applied to the inner periphery of the tire carcass, the carcass is, of course, cleaned and the rubber body is applied as heretofore described, but the body will be of a material having a composition quite similar to, or identical with, the composition of rubber impregnating the innermost ply of the tire carcass. Fig. 5 illustrates that during the shaping of the tire carcass to the toroidal form of Fig. 5, the rubber body 22a has elongated with the tread portion of the tire carcass. Thereafter, the shaped tire carcass is subjected to vulcanizing heat with the usual airbag and mold so that the heat and pressure causes the rubber body 22a to be substantially embedded in the tire carcass to almost completely eliminate any thickness or appearance of a rubber body applied to the inner periphery of the tire.

From the foregoing, it will be recognized that the various objects of the invention have been achieved by the provision of improved means and methods for facilitating, speeding up, and bettering the balancing of pneumatic tires. The balancing material is applied directly to the tire carcass while the carcass is still in its unvulcanized built form, with the carcass being subsequently shaped to toroidal form, and vulcanized under heat and pressure to almost completely obliterate any appearance or bulge of the balancing material. The bond between the balancing material and the remainder of the tire is achieved by the same vulcanizing action which cures the tire itself so that separation or balling up of the balancing material with respect to the tire carcass is eliminated. The balancing apparatus not only simplifies and improves the balancing of an unvulcanized tire carcass with all portions of the tire carcass being axially aligned with the balancing spindle, but the apparatus may be used to support the tire carcass during the application of the balancing material to the carcass.

While, in accordance with the patent statutes, several embodiments of the invention have been specifically illustrated and described, it should be particularly understood that the invention is not limited thereto or thereby, but that the scope of the invention is defined in the appended claims.

I claim:

1. That method of manufacturing a pneumatic tire which includes the steps of building a complete tire carcass in unvulcanized substantially flat band form, supporting the carcass over substantially its entire inner periphery in axially aligned relation about a vertical axis, measuring the amount of out of balance of the tire carcass while so supported, attaching a body of unvulcanized rubber of proper size to the outside tread portion of the tire carcass while still supported to bring the carcass back in balance, shaping the carcass from its built shape to toroidal form, and vulcanizing the carcass in its toroidal form by the application of heat and pressure thereto and concurrently curing the body of rubber to the carcass.

2. That method of manufacturing a pneumatic tire which includes the steps of building a complete tire carcass in substantially flat band unvulcanized form, supporting the carcass over substantially its entire inner periphery in axially aligned relation, measuring the amount of out of balance of the tire carcass while so supported, attaching a body of unvulcanized rubber of proper size to the outside tread portion of the tire carcass while still so supported to bring the carcass back in balance, shaping the carcass from its built shape to toroidal form, and vulcanizing the carcass in its toroidal form by the application of heat and pressure thereto and concurrently curing the body of rubber to the carcass.

3. That method of manufacturing a pneumatic tire which includes the steps of building a complete tire carcass in substantially flat band unvulcanized form, supporting the carcass over substantially its entire inner periphery, measuring the amount of out of balance of the tire carcass while so supported, attaching a body of unvulcanized rubber of proper size to the tire carcass to bring the carcass back in balance, shaping the carcass from its built shape to toroidal form, and vulcanizing the carcass in its toroidal form by the application of heat and pressure thereto and concurrently curing the body of rubber to the carcass.

4. That method of balancing a pneumatic tire carcass manufactured according to the flat band process before being shaped and vulcanized, said method comprising the steps of tiltably supporting the tire carcass in unvulcanized flat band form, determining from the extent of tilt of the support the point and degree of out-of-balance of the tire carcass for which correction is to be made, applying an unvulcanized patch to the tire carcass of a size sufficient to bring the tire carcass into correct balance, shaping the tire carcass and then vulcanizing the tire carcass and patch simultaneously to obliterate the patch substantially completely as far as appearance or apparent thickness of the finished tire is concerned.

5. That method of balancing a pneumatic tire carcass manufactured according to the flat band process before being shaped and vulcanized, said method comprising the steps of tiltably supporting the tire carcass in unvulcanized flat band form, determining from the extent of tilt of the support the point and degree of out-of-balance of the tire carcass for which correction is to be made, attaching a body of unvulcanized rubber of proper size to correct for the degree of out-of-balance of the tire carcass to the outside of the tread portion of the tire carcass, shaping the tire carcass, and then vulcanizing the tire carcass and patch simultaneously to obliterate the patch substantially completely as far as appearance or apparent extra thickness of the finished tire is concerned.

DANIEL E. SHEAHAN.

REFERENCES CITED

The following references are of record in the file of this patent:

UNITED STATES PATENTS

| Number | Name | Date |
|---|---|---|
| 2,193,734 | MacCracken | Mar. 12, 1940 |
| 2,199,667 | Lannen | May 7, 1940 |
| 2,242,430 | Kraft | May 20, 1941 |
| 2,245,355 | Mullen | June 10, 1941 |